Dec. 10, 1929.  M. A. POWERS  1,739,089
BURNER FOR PRODUCING HEAT FROM LIQUID FUEL
Filed Oct. 28, 1926  4 Sheets-Sheet 1
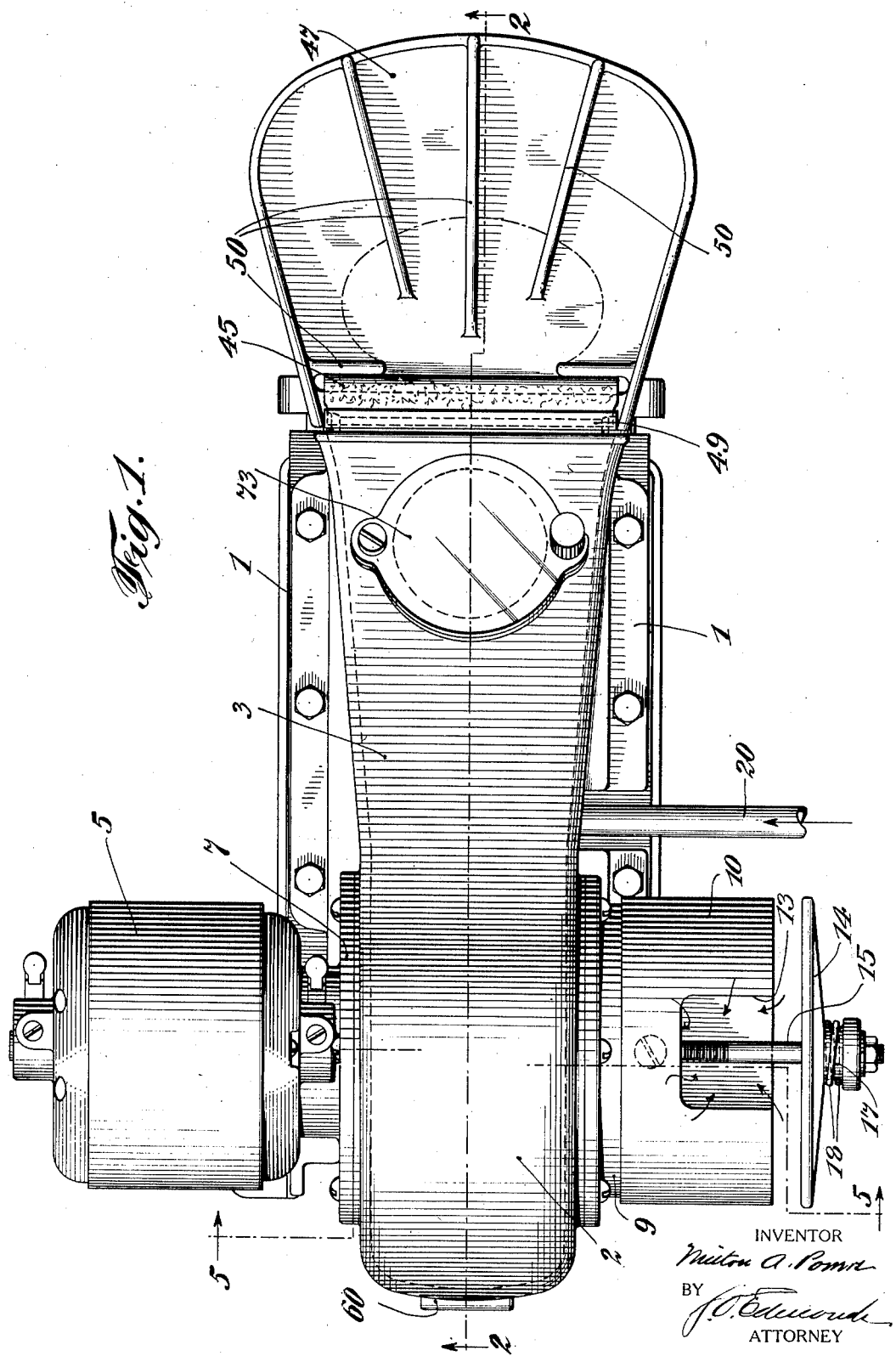
INVENTOR
Milton A. Powers
BY
ATTORNEY

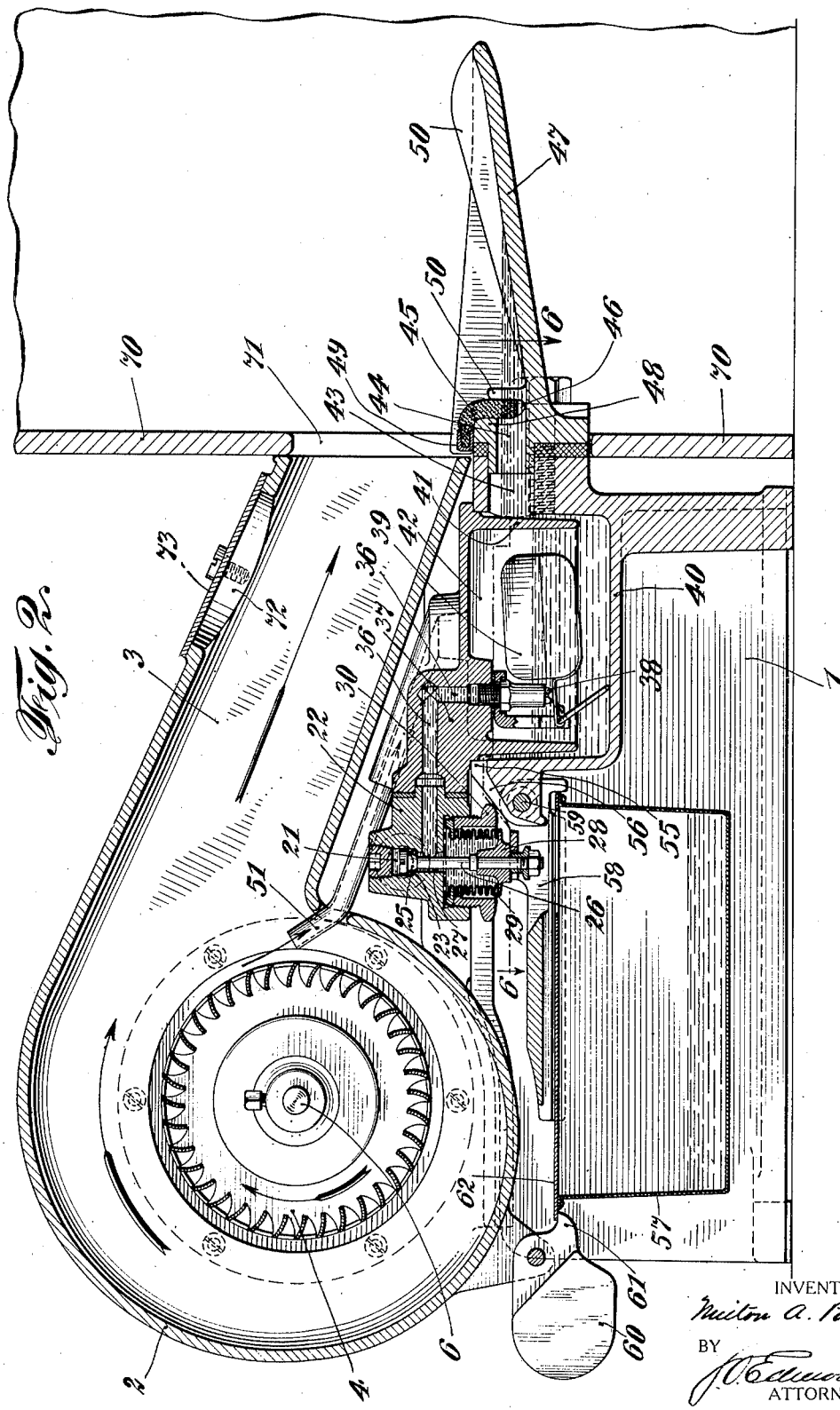

Dec. 10, 1929.  M. A. POWERS  1,739,089
BURNER FOR PRODUCING HEAT FROM LIQUID FUEL
Filed Oct. 28, 1926  4 Sheets-Sheet 3
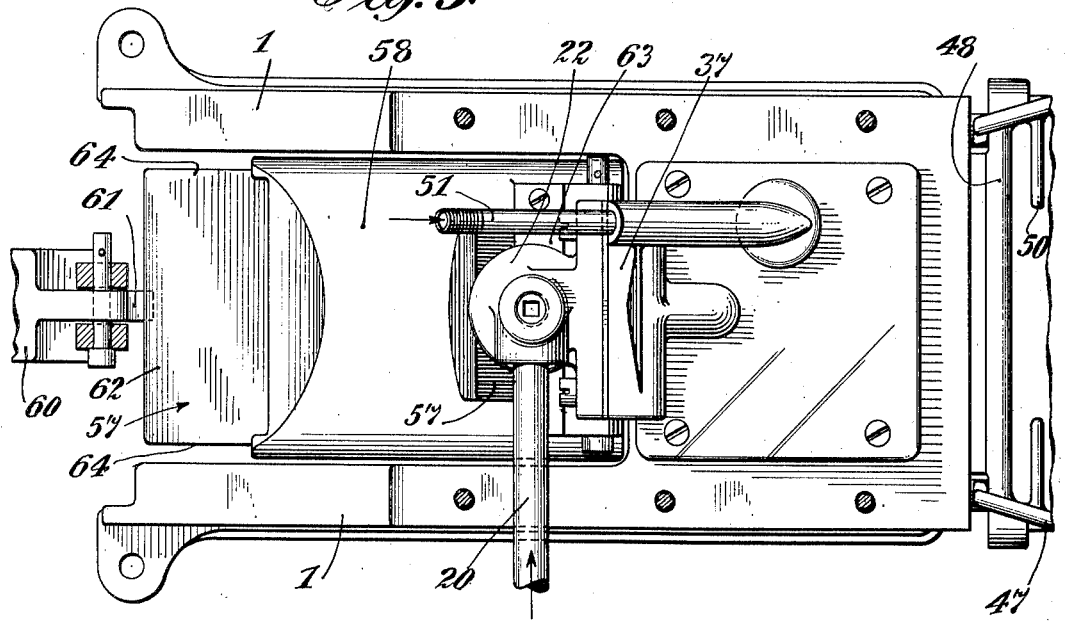
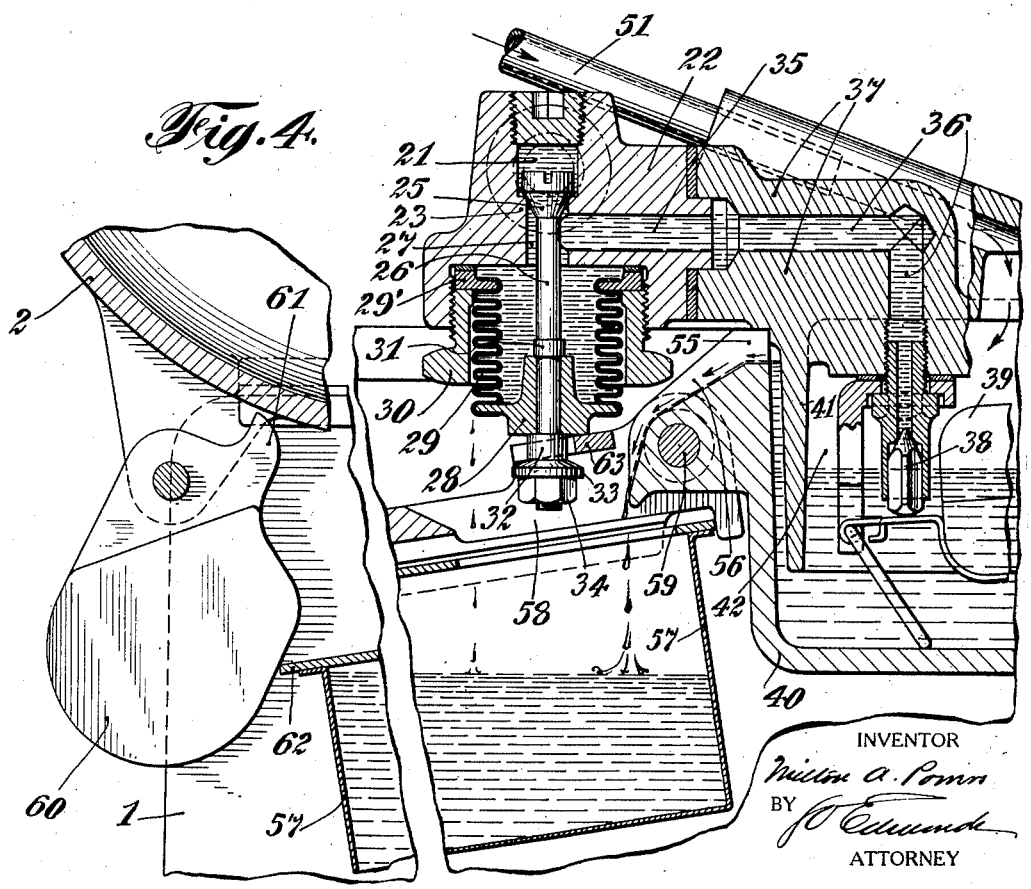
INVENTOR
Milton A. Powers
BY
ATTORNEY Dec. 10, 1929.  M. A. POWERS  1,739,089
BURNER FOR PRODUCING HEAT FROM LIQUID FUEL
Filed Oct. 28, 1926  4 Sheets-Sheet 4
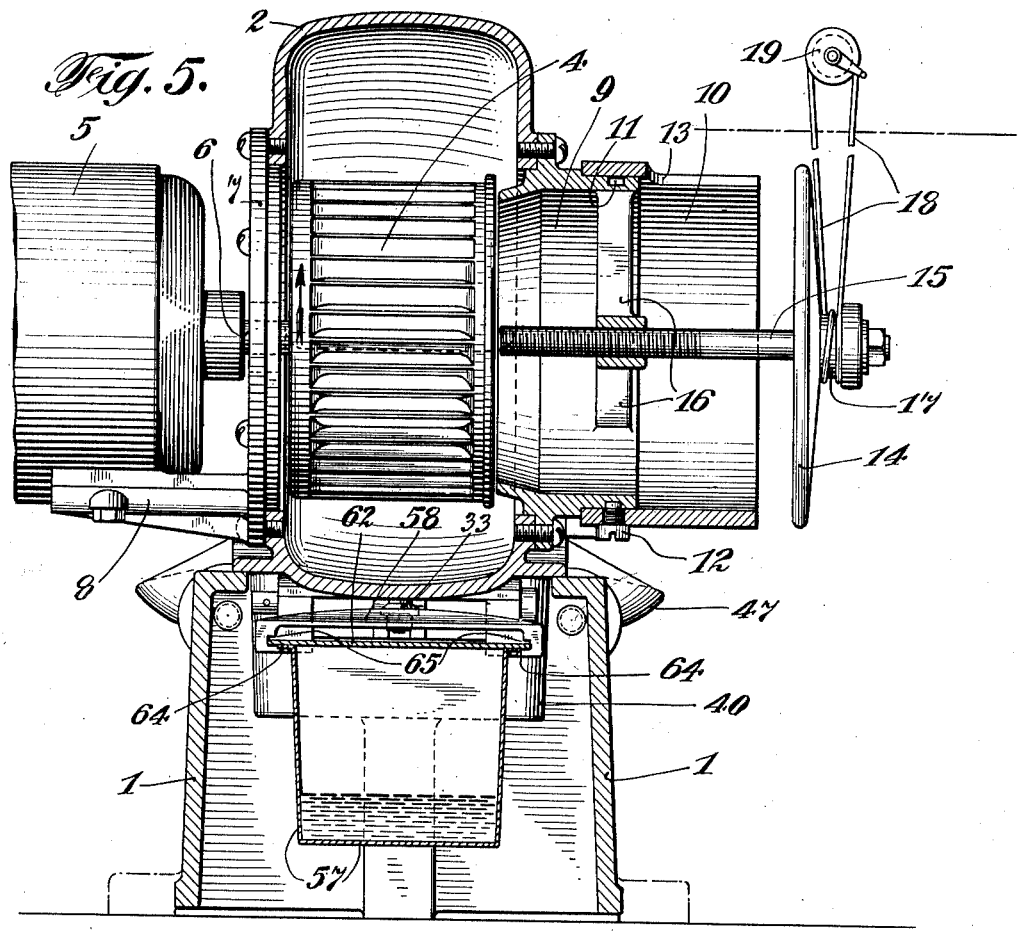
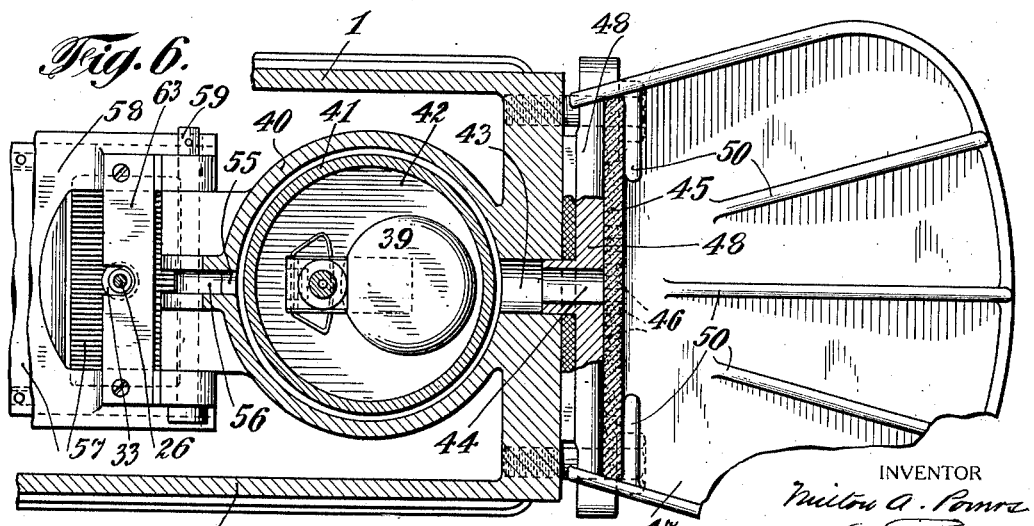
INVENTOR
Milton A. Powers
BY
ATTORNEY Patented Dec. 10, 1929

1,739,089

UNITED STATES PATENT OFFICE

MILTON A. POWERS, OF NEW YORK, N. Y., ASSIGNOR, BY MESNE ASSIGNMENTS, TO THE TIMKEN-DETROIT COMPANY, OF DETROIT, MICHIGAN, A CORPORATION OF MICHIGAN

BURNER FOR PRODUCING HEAT FROM LIQUID FUEL

Application filed October 28, 1926. Serial No. 144,703.

This invention relates to a burner for producing heat from liquid fuel.

One principal object of the invention is to provide a method of burning liquid fuel to produce an extremely effective and clean heating flame, in a safe and economical manner, by means of simple and inexpensive apparatus; and another principal object of this invention is to provide an oil burner which produces an extremely effective and clean heating flame, safely, silently and at low cost, and to provide a burner which is characterized by simplicity and inexpensiveness of construction, simplicity of control and regulation, and efficiency in operation.

Other objects of this invention will be in part obvious and in part pointed out hereinafter.

In accordance with this invention, a constant flame is maintained by causing a copious stream or flow of air, moving at moderate velocity (low pressure), to impinge against the surface of a shallow puddle or pool of heated liquid fuel, the air flow preferably passing over an ignited wick, or other flaming medium, located in proximity of the pool of fuel. The heat of the flame above the pool of fuel preferably is utilized to heat the fuel pool both directly and by conduction through the pan or trough in which the pool of fuel is maintained. The invention also contemplates the automatic maintenance of a rate of fuel supply to the pool in correspondence with the volume of the said air flow, the air and fuel flow preferably being subject to regulation by the operator. A single pneumatic device, such as an air fan or blower, preferably serves as the actuator for both the air flow and the fuel flow to the said zone of combustion. The invention also contemplates the effecting of corresponding variations in the rates or volume of air flow and the rate of fuel feed to the zone of combustion by regulating the air inlet conditions to the air flow producing means. Optionally, the invention also contemplates the effecting of variations in the relative ratio of air flow to fuel flow by varying the air inlet conditions to the air fan or blower in another manner.

The burner, in accordance with this invention, includes means for carrying out the various steps and operations referred to, and preferably also includes means whereby the tendency of an overabundance of fuel to accumulate at the zone of combustion, or at other parts of the burner, will cause a safety valve to shut off the fuel supply automatically, and will require the operator to make certain adjustments at the burner before the shut off condition of the oil supply can be relieved and before the operation of the burner can be resumed.

In order that a clearer understanding of my invention may be had, attention is hereby directed to the accompanying drawings forming part of this application and illustrating certain possible embodiments of this invention. Referring to the drawings, Fig. 1 is a top view of a burner embodying this invention; Fig. 2 is a sectional view thereof, and is taken on the line 2—2 of Fig. 1; Fig. 3 is a top view of the lower part of the burner; Fig. 4 is an enlarged sectional detail, partly broken away, of a portion of the safety cut off mechanism; Fig. 5 is a sectional view, and is taken on the line 5—5 of Fig. 1; and Fig. 6 is a sectional view taken through the front portion of the burner on the line 6—6 of Fig. 2. Similar reference characters refer to similar parts throughout the several views of the drawings.

Referring to the drawings, there is a suitable base or supporting frame 1 on which is mounted a blower housing 2 having a downwardly inclined tubular portion 3 through which a suitable blower 4, mounted in the housing, discharges a stream or flow of air, preferably with relatively slow velocity and under relatively low pressure. An electric motor 5, or other suitable means, drives the blower, which may be mounted on an extension of the armature shaft 6 of the motor, shaft 6 being journalled in a side plate 7 secured to one side of housing 2. The motor may be mounted on an extension 8 of the base 1. At the side of the housing opposite the motor is the air inlet to the blower. The inlet duct is formed by a fixed annular sleeve 9 secured to the side of the housing 2, and another sleeve 10, partially telescoped upon the sleeve 9, and forming an extension of the air duct. Sleeve 9 has a groove 11 in which engages a set screw 12 carried on sleeve 10 whereby sleeve 10, and an incision or notch 13 therein, may be adjusted coaxially into various relative positions with respect to sleeve 9. Obviously, adjustment of the position of opening 13 will change the air inlet conditions maintaining through the duct to the fan. More will be said later regarding this notch 13. The air inlet conditions at the duct may also be varied by adjusting a shutter disc 14 axially toward and from the end of the duct. This disc 14 is carried on a screw 15 which is threaded in a spider 16 secured to the inside of sleeve 9, so that the disc may be placed nearer to or farther from the end of the duct by merely rotating the disc in one direction or the other. Preferably a pulley wheel 17 is associated with disc 14 so that the disc may be adjusted relatively to the duct from a remote control point, as by means of a belt 18, or the like, engaging pulley wheel 17, and another wheel 19 positioned at the remote control point.

Fuel oil is supplied to the burner from a suitable source, not shown, through a pipe 20 which leads to a cavity 21 in burner part 22 above a valve seat 23. A packingless valve plunger has a valve portion 25 coacting with seat 23, and has a stem 26 extending through a passage 27 and through a hub 28 which is sealed to an annular, bellows-like, expansion member 29. A ring 29' is sealed to the upper end of the member 29, and a nipple 30, threaded into part 22, holds member 29 in place in a leak proof manner. Stem 26 is provided with collars 31 and 32 on opposite sides of hub 28. The extreme end of stem 26 is threaded and carries washer 33 and nut 34. The normal path of fuel flow through the burner, beyond the valve referred to, is through a passage 35 in part 22, thence through an angular passage 36 in another burner part 37 to a needle valve 38, controlled by suitable float mechanism 39, to maintain a constant level fuel supply in a receptacle 40. The burner part 37 presents an annular flange 41 extending into the receptacle 40 and thus forms a pressure chamber 42 over the fuel in the center of the receptacle, so that in response to pressure conditions in chamber 42 the fuel will be forced to the outlet passage 43 from the constant level receptacle, and will thence flow through passage 44 to a wick 45, and through notches or cuts 46 in the bottom of wick 45 onto a tray or pan 47. The bed of pan 47 inclines upwardly in advance of and at the sides of the opening 44 so as to cause the fuel to form a pool or puddle on the pan, with the deepest part of the pool extending along the wick 45. The top of wick 45 preferably lies over the top of wall 48 of the pan and its edge may be bound by metal 49, or other suitable material, to decrease the tendency of the wick to be consumed by burning. The pan is preferably provided with fins 50, or similar formations, which enter the pool of fuel and aid in conducting heat thereto.

Air pressure to effect the supply of fuel to the tray 47 is derived from the blower 4 by positioning in a suitable location in proximity to the blower blades, the end of a small pipe or tube 51 which leads into the pressure chamber 42, and by placing the notch 13 of air duct sleeve 10 in the proper position in accordance with the position of the end of pipe 51 relative to the blower 4 and its housing and discharge opening. It has been found that when the end of pipe 51 is located approximately in line with the lower wall of the discharge duct from the blower, as shown in Fig. 2 of the drawings, and the notch 13 in sleeve 10 of the air inlet duct is positioned approximately in a diametrically opposite position relatively to the fan, that is, rotated into a position ninety degrees to the right from the position shown in Fig. 1, the volume of air discharge per unit of time through duct 3 and the amount of pressure created in pressure chamber 42 transmitted through pipe 51, will vary roughly in relatively proportional amounts as the shutter 14 is adjusted to vary the open condition of the air inlet duct to the blower. When the air duct to the blower is opened wider, increased pressure in chamber 42 will speed up the rate of oil flow to the burner tray 47, and the volume of air per unit of time directed upon the fuel in tray 47 will also be increased. When the air inlet to the blower is throttled down the fuel feed air pressure and the rate of delivery of combustion air automatically decrease in proportion. Thus there is maintained automatically a balanced ratio of combustion air flow and fuel flow over wide variations in the rate of fuel combustion, and the rate of fuel combustion, and consequently the amount of burner flame, is subject to most simple regulation. Such regulation may be made by merely rotating the shutter 14 to move it nearer to or farther from the air duct opening.

By adjusting the notch 13 into different positions the air pressure in pipe 51 and pressure chamber 42 can be varied relatively to the rate of air delivery through duct 3.

In the rear of fuel receptacle 40 is a safety aperture 55, higher than the fuel outlet 43 but lower than the edges of burner tray 47, so that at no time can sufficient fuel accumulate on tray 47 to overflow the same. When the fuel at outlet orifice 43 reaches the height of the overflow drain 55 the fuel flows through this drain and down a passage 56 which conducts the fuel into an overflow pan 57. Pan 57 rests in a cradle 58 which is pivotally suspended at one end on a pin 59, and the pan and cradle are maintained in horizontal position by means of a pivoted weight 60 which has a finger 61 engaging beneath a flange 62 on the end of the pan opposite the cradle pivot, this engagement between finger 61 and pan 57 also keeping the weight raised. The weight 60 overbalances the weight of the cradle and pan until a predetermined amount of oil has accumulated in pan 57, and then the weight of this oil causes weight 60 to be overbalanced, allowing the adjacent end of pan 57 and the cradle to drop by gravity. Preferably the pan is partly covered to prevent oil from spilling therefrom when the pan tips. Cradle 58 is provided with a notched member 63 which embraces the valve stem 26 between the hub 28 and washer 33, so that when the cradle 58 tips, due to the overbalancing of the weight 60, or due to the removal of the pan 57, member 63 will pull down the valve stem 26, closing the valve 23, 25, and thus cutting off completely the fuel supply to receptacle 40, and consequently to the burner tip 47.

When the pan has thus disengaged itself from weight 60 the fuel valve 23, 25, cannot be readjusted into normal open condition until the pan has been emptied of the overflowed oil and has been reengaged with the weight 60. Preferably the pan is readily removable from the cradle, and to this end it may be provided with side flanges 64 which slidably seat in grooves 65 provided therefor on opposite sides of the cradle.

There are no means for keeping the cradle raised to open the fuel valve in the absence of the pan 57.

Preferably the top of pan 57 is open beneath the fuel valve so that in case any leakage should occur here the leaking fuel will drip into pan 57 and, by overbalancing the weight 60, will cause a closing of the fuel supply, thus eliminating the possibility of a dangerous condition arising should a leak of this character develop.

The burner may be positioned with the tray 47 disposed in the fire-box of a furnace to be heated thereby, the wall 70 of the fire-box being apertured, as at 71, for the tray 47 and to permit free access of the combustion air from the blower to the fuel on this tray, the burner flame being thus produced entirely within the fire-box.

When the burner is not operating the normal level of fuel, controlled by the float valve 38, is such that a small quantity of fuel may or may not be on the tray 47 dependent on the adjustment of the feed valve float. Wick 45 dips into this fuel and normally burns constantly. Initially, or in case the wick should become extinguished, it may be ignited readily by means of a taper applied thereto through an aperture 72 in the air duct 3, provided with a removable cover 73.

To start the burner it is merely necessary to turn on the current to the motor 5, since this causes the blower 4 to propel a flow of combustion air upon the pool of fuel on tray 47 so as to create a combustible vapor over the tray which will be ignited by the flame of wick 45. Tray 47 and the fuel thereon quickly become warmer due to the continuation of the combustion, and the oil is vaporized more rapidly. Thus the desired flame will build up rapidly and thereafter will remain constant. At the same time the blower produces air pressure in tube 51 and in the pressure chamber 42, so that fresh fuel is supplied to tray 47 in proportion to the rate of consumption.

Should it be desired to decrease the size of the flame at the tray 47 it is merely necessary to adjust the shutter 14 closer to the air duct sleeve 10, since such adjustment will throttle the air inlet and will cause the blower to deliver less air to the fuel on tray 47 and will cause the blower to build up less air pressure in pressure chamber 42. If it is desired to increase the flame it is merely necessary to rotate shutter 14 into a position farther from the sleeve 10, to render the air inlet to the blower less obstructed.

To stop the burner it is merely necessary to stop the motor 5.

The fuel feed may possibly be designated as being of the gravity-feed, float controlled type, but the feed is increased by air pressure derived from the same means that produces the flow of combustion air, and said means, although subject to regulation to vary the rate of air flow and fuel feeding pressure, operate to maintain a substantially constant ratio of air flow to fuel feed over approximately the whole range of regulation.

It will be apparent from the above that the method and apparatus are characterized by safety, efficiency, economy and simplicity, and that the burner may be made very small and compact.

As many changes could be made in the above construction, and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. In a burner of the character described, in combination, a tray for liquid fuel, means for maintaining a pool of liquid fuel on said tray, means for impinging a stream of air against the surface of said pool of fuel to create a combustible mixture of said air and vapors from said pool of fuel, means for igniting said combustible mixture, and pneumatic means for producing a flow of liquid fuel to said tray.

2. In a burner of the character described, in combination, a tray for liquid fuel, means for maintaining a pool of liquid fuel on said tray, means for impinging a stream of air against the surface of said pool of fuel to create a combustible mixture of said air and vapors from said pool of fuel, means for igniting said combustible mixture, and pneumatic means for automatically replenishing the fuel pool in accordance with the rate of fuel consumption in the flaming mixture.

3. In a burner of the character described, in combination, a tray for liquid fuel, means for maintaining a pool of liquid fuel on said tray, means for impinging a stream of air against the surface of said pool of fuel to create a combustible mixture of said air and vapors from said pool of fuel, means for igniting said combustible mixture, pneumatic means for automatically replenishing the fuel pool in accordance with the rate of fuel consumption in the flaming mixture, and safety means automatically preventing a sufficient accumulation of fuel on said tray to overflow the same.

4. In a burner of the character described, in combination, a tray for liquid fuel, means for maintaining a pool of liquid fuel on said tray, means for impinging a stream of air against the surface of said pool of fuel to create a combustible mixture of said air and vapors from said pool of fuel, pneumatic means for producing a flow of combustion air and a flow of liquid fuel to said tray at relatively proportional rates and means, comprising a wick dipping into said fuel pool, for igniting said combustible mixture.

5. In a burner of the character described, in combination, a tray for liquid fuel, means for maintaining a pool of liquid fuel on said tray, means including a blower for impinging a stream of air against the surface of said pool of fuel to create a combustible mixture of said air and vapors from said pool of fuel, means operative in conjunction with said blower for controlling the fuel flow to said tray, means for igniting said combustible mixture, and means, comprising fins on the bed of the tray, for conducting heat from the ignited mixture to the fuel pool to accelerate vaporization thereof.

6. In a burner of the character described, a tray for holding a pool of liquid fuel, a fuel conduit directing liquid fuel onto the tray, an air conduit directed toward the surface of said tray, means, comprising a blower, for propelling a stream of air through the air conduit to impinge against fuel on said tray and to form a combustible mixture with vapors from said fuel, means operative in conjunction with said blower for controlling the fuel flow to said tray, and means for igniting the combustible mixture.

7. In a burner of the character described, a tray for holding a pool of liquid fuel, a fuel conduit directing liquid fuel onto the tray, an air conduit directed toward the surface of said tray, and means, comprising a blower, for propelling a stream of air through the air conduit to impinge against fuel on said tray and to form a combustible mixture with vapors from said fuel, and for propelling liquid fuel through said fuel conduit to the tray, and means for igniting the combustible mixture.

8. In a burner of the character described, in combination, a tray for liquid fuel, means including a blower for moving a stream of air into contact with the liquid fuel on said tray to vaporize said liquid fuel, and fuel feed means operated by air pressure for delivering liquid fuel to the tray.

9. In a burner of the character described, in combination, a tray for liquid fuel, means including a blower for moving a stream of air into contact with the liquid fuel on said tray to vaporize said liquid fuel, and fuel feed means for delivering liquid fuel to the tray, said fuel feed means including a pressure chamber operative in conjunction with said blower for producing air pressure in said chamber.

10. In a burner of the character described, in combination, a tray for liquid fuel, means including a blower for moving a stream of air into contact with the liquid fuel on said tray to vaporize said liquid fuel, and fuel feed means for delivering liquid fuel to the tray, said fuel feed means including, a pressure chamber and a pipe having an open end positioned adjacent to the blower and leading into the pressure chamber.

11. In a burner of the character described, in combination, a tray for liquid fuel, means including a blower for vaporizing fuel from the tray, a fuel receptacle in communication with the tray, a bell-like member extending into the fuel receptacle from above and forming a pressure chamber over liquid in said receptacle, a fuel conduit leading into the receptacle through the bell-like member, a float valve in said conduit controlled by the level of liquid within the confines of the bell-like member, and means operative in conjunction with said blower for establishing air pressure in said pressure chamber to cause fuel to flow from the receptacle to the tray.

12. In a burner of the character described, in combination, a tray for liquid fuel, means for vaporizing and burning fuel from the tray, a fuel receptacle in communication with the tray, a bell-like member extending into the fuel receptacle from above and forming a pressure chamber over liquid in said receptacle, a fuel conduit leading into the receptacle through the bell-like member, a float valve in said conduit controlled by the level of liquid within the confines of the bell-like member, and means, including a blower and a pipe extending from the vicinity of the blower into the pressure chamber, for establishing air pressure in said pressure chamber to cause fuel to flow from the receptacle to the tray.

13. In a burner of the character described, in combination, a tray for liquid fuel, means, including a blower and an air duct from the blower to the tray, for impinging a stream of air against the surface of a pool of liquid fuel on the tray, a fuel receptacle in communication with the tray, a pressure chamber over fuel in the receptacle, a fuel conduit leading into the receptacle through the pressure chamber, a float valve in said conduit controlled by the level of liquid fuel within the confines of the pressure chamber, and means, including a pipe extending from the vicinity of the blower into the pressure chamber, whereby the blower also creates pressure in the pressure chamber to cause fuel to flow from the receptacle to the tray.

14. In a burner of the character described, in combination, a tray for liquid fuel, means, including a blower and an air duct from the blower to the tray for impinging a stream of air against the surface of a pool of liquid fuel on the tray, a fuel receptacle in communication with the tray, a pressure chamber over fuel in the receptacle, a fuel conduit leading into the receptacle through the pressure chamber, a float valve in said conduit controlled by the level of liquid fuel within the confines of the pressure chamber, means, including a pipe extending from the vicinity of the blower into the pressure chamber, whereby the blower also creates pressure in the pressure chamber to cause fuel to flow from the receptacle to the tray, an air inlet to the blower, and means for adjusting said inlet to vary simultaneously the rate of air flow and the intensity of air pressure created by the blower.

15. In a burner of the character described, in combination, a tray for liquid fuel, means, including a blower and an air duct from the blower to the tray for impinging a stream of air against the surface of a pool of liquid fuel on the tray, a fuel receptacle in communication with the tray, a pressure chamber over fuel in the receptacle, a fuel conduit leading into the receptacle through the pressure chamber, a float valve in said conduit controlled by the level of liquid fuel within the confines of the pressure chamber, means, including a pipe extending from the vicinity of the blower into the pressure chamber, whereby the blower also creates pressure in the pressure chamber to cause fuel to flow from the receptacle to the tray, an air inlet to the blower, and means for adjusting said inlet to vary simultaneously and in relatively proportional amounts, the rate of air flow and the intensity of air pressure created by the blower.

16. In a burner of the character described, in combination, a tray for liquid fuel, means, including a blower and an air duct from the blower to the tray for impinging a stream of air against the surface of a pool of liquid fuel on the tray, a fuel receptacle in communication with the tray, a pressure chamber over fuel in the receptacle, a fuel conduit leading into the receptacle, a float valve operative to regulate the fuel flow through said conduit, said float valve being controlled by the level of liquid fuel within the confines of the pressure chamber, and means, including a pipe extending from the vicinity of the blower into the pressure chamber, whereby the blower also creates pressure in the pressure chamber to cause fuel to flow from the receptacle to the tray.

17. In a burner of the character described, in combination, a tray for liquid fuel, an air duct directed toward said tray, a receptacle for liquid fuel communicating with said tray, a pressure chamber associated with said receptacle, a take-off air pressure pipe communicating with said pressure chamber, a blower directing air through said air duct upon the surface of a pool of fuel on said tray and forcing air into said take-off pipe to force a flow of fuel from said receptacle to the fuel pool, a duct for admitting air to the blower, and an adjustable shutter at the air entrance into the duct, whereby the rate of air flow to the fuel pool and the air pressure in the pressure chamber may be varied simultaneously to diminish and to increase the rates of air flow and fuel feed to the tray in relatively proportional amounts.

18. In a burner of the character described, in combination, a tray for liquid fuel, a fuel receptacle in communication with the tray, a bell like member extending into the fuel receptacle and forming a pressure chamber over the fuel in said receptacle and means for establishing air pressure in said pressure chamber to cause fuel to flow from the receptacle to the tray.

19. In a burner of the character described, in combination, a tray for holding a pool of liquid fuel, a fuel conduit directing liquid fuel onto the tray, means for impinging a stream of air against the surface of said pool of fuel to create a combustible mixture of said air and vapors from said pool of fuel, and pressure means associated with said impinging means operative to cause fuel to flow through said fuel conduit and onto the tray.

20. In a burner of the character described, in combination, a tray for holding a pool of liquid fuel, a fuel conduit directing liquid fuel onto the tray, means for impinging a stream of air against the surface of said pool of fuel to create a combustible mixture of said air and vapors from said pool of fuel, and means responsive to velocity variations in said air stream operative to cause fuel to flow through said fuel conduit and onto said tray.

21. In a burner of the character described, in combination, a tray for liquid fuel, a blower, means operative to conduct a stream of air from said blower to impinge against the surface of the pool of liquid fuel on the tray, a fuel receptacle in communication with said tray, a pressure chamber over fuel in said receptacle, and means for conducting air from said blower to said pressure chamber.

22. In a burner of the character described, in combination, a tray for liquid fuel, a blower, means operative to conduct a stream of air from said blower to impinge against the surface of a pool of liquid fuel on the tray, a fuel receptacle in communication with said tray, a pressure chamber over fuel in said receptacle, and a pipe having an open end positioned adjacent to the blades of the blower and leading into the pressure chamber.

23. In a burner of the character described, in combination, a tray for holding a pool of liquid fuel, a fuel receptacle in communication with the tray, a blower, means operative to conduct a stream of air from said blower to impinge against the surface of a pool of liquid fuel on the tray, means extending from the vicinity of the blower into the receptacle whereby the blower also creates pressure to cause fuel to flow from the receptacle to the tray, an air inlet to the blower, and means for adjusting said inlet to vary simultaneously the rate of air flow and the intensity of air pressure created by the blower.

24. In a burner of the character described, in combination, a tray for liquid fuel, means for conducting fuel to said tray, means for conducting a stream of air to said tray, means operative to force air through said air conducting means and to create pressure in said fuel conducting means to cause fuel to flow to said tray, an air inlet to the blower, and means for adjusting said inlet to vary simultaneously and in relative proportional amounts, the rate of air flow and the intensity of air pressure created by the blower.

25. In a burner of the character described, in combination, a tray for liquid fuel, means operated by pressure for feeding fuel to said tray, a blower, an air duct from the blower to the tray for impinging a stream of air against the surface of a pool of liquid fuel on the tray, an air inlet to the blower, and means for adjusting said inlet to vary the intensity of the air pressure created by the blower in the pressure chamber without materially affecting the rate of air flow created by the blower.

26. A burner of the character described comprising in combination, a base member, a fuel reservoir block suspended within and secured to one end of the base member, regulating mechanism in said block, and a blower housing secured to the other end of the base member and extending over said reservoir.

27. A burner of the character described, comprising, in combination, a base member, a fuel reservoir block suspended within and secured to the base member, a combustion tray secured to one end of the base member, and a blower housing secured to the other end of the base member, and extending over the length of said base.

28. A burner of the character described, comprising, in combination, a base member, a fuel reservoir block suspended within and at one end of the base member, and a drip bucket mechanism suspended within and at the other end of the base member.

29. A burner of the character described, comprising, in combination, a base member, a fuel reservoir block suspended within and secured to one end of the base member, and a safety valve block secured to the inner face of said reservoir block.

30. A burner of the character described, comprising, in combination, a base member, a fuel reservoir block suspended within and secured to one end of the base member, a safety valve block secured to the inner face of said reservoir block, and a blower housing secured to said base member, said blower housing having an air conduit forming portion overhanging said valve block.

31. A burner of the character described, comprising, in combination, a liquid fuel reservoir, a fuel conduit leading to said reservoir, a valve in said conduit, means for operating said valve from open to closed position including an arm member connected to said valve and pivotally supported at one end, and a container suspended from the other end of said arm adapted to descend when a predetermined weight of liquid fuel has passed into the container to close said valve.

32. A burner of the character described, comprising, in combination a tray for liquid fuel, a liquid fuel reservoir, a fuel passage leading from the reservoir to the tray, a fuel supply conduit leading into said reservoir, a float valve in said reservoir operative to prevent flooding of said tray, a safety valve in said conduit, and overflow means operative to close said safety valve should the float valve fail to operate.

This specification signed this 22nd day of October, 1926.

MILTON A. POWERS.